United States Patent
Viljoen

(10) Patent No.: US 7,757,284 B1
(45) Date of Patent: Jul. 13, 2010

(54) THREAT-RESISTANT INSTALLER

(75) Inventor: Pieter Viljoen, Marina Del Rey, CA (US)

(73) Assignee: Symantex Corporation, Mountain View, CA (US)

( * ) Notice: Subject to any disclaimer, the term of this patent is extended or adjusted under 35 U.S.C. 154(b) by 1077 days.

(21) Appl. No.: 11/317,513

(22) Filed: Dec. 22, 2005

(51) Int. Cl.
*G06F 11/00* (2006.01)
*G06F 12/14* (2006.01)
*G06F 12/16* (2006.01)
*G08B 23/00* (2006.01)

(52) U.S. Cl. .......................................... 726/22; 380/1
(58) Field of Classification Search ................... 726/22; 380/1
See application file for complete search history.

(56) References Cited

U.S. PATENT DOCUMENTS

| | | | | |
|---|---|---|---|---|
| 6,192,475 B1 * | 2/2001 | Wallace | ....................... | 713/190 |
| 6,968,551 B2 * | 11/2005 | Hediger et al. | .............. | 717/174 |
| 7,287,166 B1 * | 10/2007 | Chang et al. | ................ | 713/187 |
| 2003/0208685 A1 * | 11/2003 | Abdel-Rahman | ........... | 713/191 |
| 2005/0235282 A1 * | 10/2005 | Anderson | ................... | 717/178 |
| 2006/0031686 A1 * | 2/2006 | Atallah et al. | ............... | 713/190 |

* cited by examiner

*Primary Examiner*—Kambiz Zand
*Assistant Examiner*—Stephen Sanders
(74) *Attorney, Agent, or Firm*—Fenwick & West LLP

(57) ABSTRACT

An install control module allows installation of a software application onto a computer in presence of malicious code that is attempting to prevent installation. A metamorphic installation program is generated randomly to be substantially unique using metamorphic stealthing techniques. The program can be installed and is executed on the computer. Identifying information in the metamorphic installation program is substantially disguised from the malicious code so the program is substantially unrecognizable. The software application is installed onto the computer, and the metamorphic program protects the installation to allow the software application to be installed without substantial interference from the malicious code. In another embodiment, installation occurs by booting a preinstall environment on the computer without running a primary operating system. The software application is installed offline without the primary operating system running and before malicious code present on the computer is executed.

20 Claims, 7 Drawing Sheets

THREAT-RESISTANT INSTALLER

BACKGROUND OF THE INVENTION

1. Field of the Invention

This invention pertains in general to software installation, and more specifically to installation of software applications in the presence of threats that are actively attempting to prevent the installation.

2. Description of the Related Art

Computer systems are continually threatened by a risk of attack from malicious computer code, such as viruses, worms, and Trojan horses. As used herein, "threats," or "malicious computer code" or "malicious code" include any code that enters a computer without an authorized user's knowledge and/or without an authorized user's consent, or any code that enters a computer with a user's consent where the user might not have understood that the code is malicious or might not have been aware of how difficult or impossible it would be to remove the code.

Malicious code can infect a computer in a number of manners. For example, a user might insert an infected disk or other computer-readable medium into a computer so that the computer becomes infected when the disk files are accessed. In a network-based attack, malicious code can be transmitted to the computer connected to the network as an executable program, for example in an attachment to an electronic message.

Computer security programs, such as antivirus prevention/detection software, can be installed on computers in an attempt to prevent malicious code attacks. For example, anti-virus-scanning software scans computer files, including electronic message attachments and electronic messages, to detect the presence of malicious code. However, in order for this antivirus software to be effective in protecting a computer it must first be successfully installed on the computer without interference. Yet, in some cases, a user may attempt to install antivirus products (or any other type of software product) on an already threat-infected machine, and the threat (e.g., malicious code) may prevent or otherwise hinder the product installation from completing or succeeding. Thus, the computer is left infected and unprotected.

Many current installation mechanisms do not attempt to prevent detection by malicious code. Once the installation is detected by the malicious code, this threat may attack the installation and prevent the install or cause the product to install incorrectly. Even if the threat does not actively try to prevent the installation, the presence of the threat on the computer can destabilize the system to such an extent that the installation of the software application will fail as a side effect of the destabilization. One mechanism for managing this issue is to do a quick scan of the computer before the installation starts and try to stop anything detected before starting the installation. However, there must be some mechanism available on the computer for effectively conducting this scan, and there is still no guarantee that all threats will be detected and will be able to be prevented before the installation occurs.

Some installation mechanisms rely on a protection module to be installed (or to be already present on the computer) that will then prevent the threat from attacking the new installation. Thus, some installation mechanisms try to quickly install a small piece of protection software that will then protect the remainder of the installation so the target software application can be installed completely and successfully. However, the protection module itself is still susceptible to attack from the threat during the protection module installation. Many current threats are now becoming aware of this protection module technique and are responding by trying to prevent the protection module itself from correctly installing on the computer, and thus preventing the ultimate installation of the software application of interest (e.g., the antivirus program). Thus, antivirus software (or other type of software) might still fail to install correctly, or might not install at all, again leaving the computer unprotected.

Therefore, there is a need in the art for a solution that allows the installation of a software application to succeed, in the presence of threats that are actively attempting to prevent the installation, without being detected, thus avoiding interference by the threats in the installation process.

DISCLOSURE OF INVENTION

The above need is met by an install control module that allows installation of a software application in the presence of malicious code trying to prevent the installation. A generation module generates a metamorphic installation program for installation of the software application onto the computer. The metamorphic installation program is generated randomly to be substantially unique while still having substantially same functionality as other unique instances of the metamorphic installation program. In some embodiments, a metamorphic program installation module installs the metamorphic installation program on the computer. An execution module executes the metamorphic installation program on the computer. Identifying information in the metamorphic installation program is substantially disguised from the malicious code so the metamorphic installation program is substantially unrecognizable. A software installation module installs the software application onto the computer. The metamorphic installation program protects the installation to allow the software application to be installed without substantial interference from the malicious code.

In another embodiment, the install control module 120 installs a software application onto a computer in a manner that is unaffected by malicious code that may be present on the computer. A preinstall environment boot module boots a preinstall environment on the computer without running a primary operating system on the computer. A software installation module installs the software application onto the computer running the preinstall environment. The installation occurs offline without the primary operating system running, and thus the installation occurs before malicious code that may be present on the computer is executed. A primary boot module boots the primary operating system on the computer, and an execution module executes the installed software application.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Figure 1:
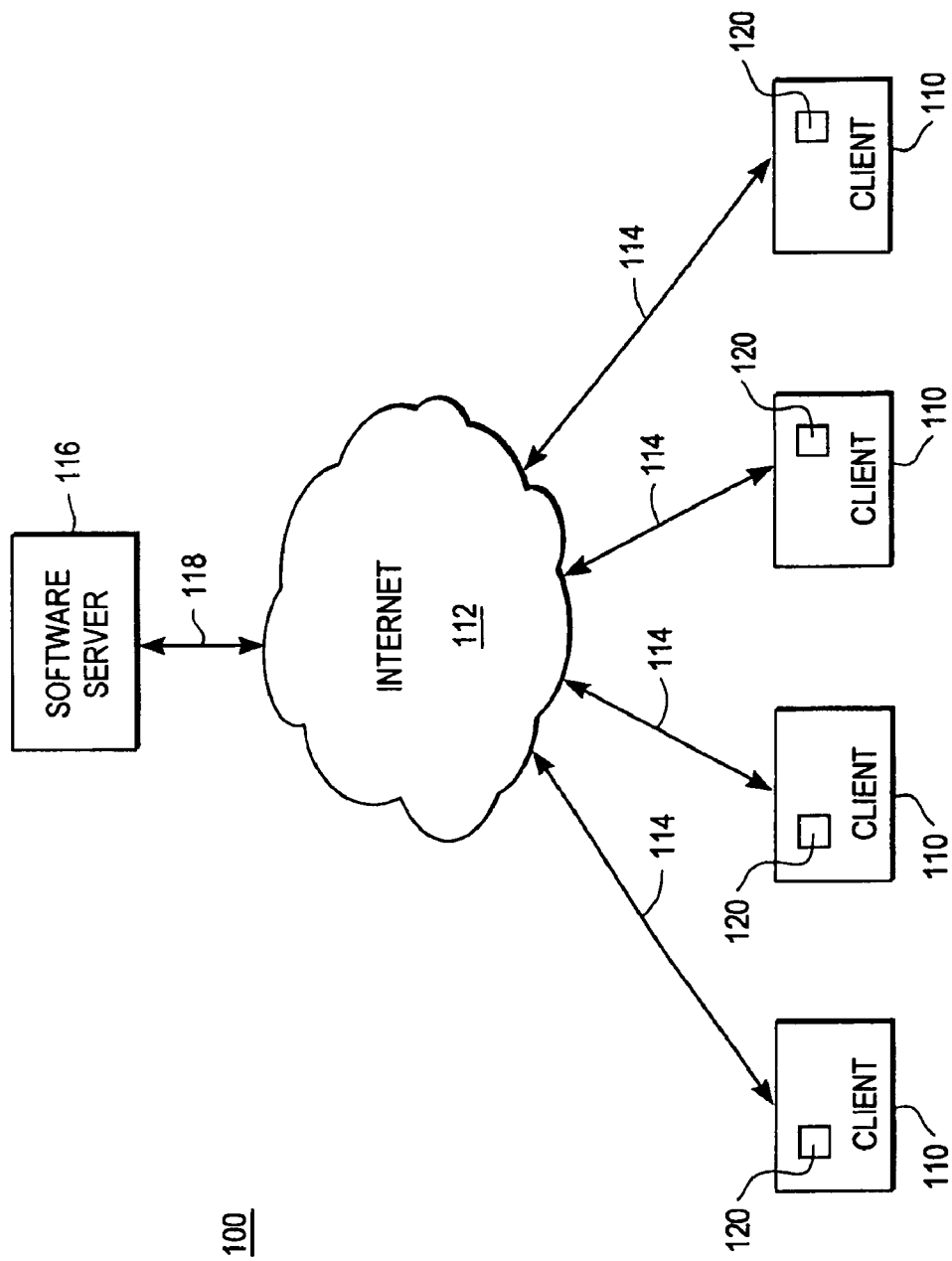
FIG. 1 is a high-level block diagram illustrating an example of a standard computing environment 100, according to one embodiment of the present invention.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

The install control module is designed to allow installation of a software application in the presence of a threat that is trying to prevent the installation. As described above, when an attempt is made to install a software application without any protection mechanism on a computer that is infected with some type of active threat or malicious code (e.g., some type of virus, worm, Trojan horse, spyware, adware, and the like), this threat may detect that the installation of the program is occurring and may try to prevent the installation or cause the application to install incorrectly. The malicious code might detect the installation by recognizing the name of certain files that are being executed, installed, or being used by recognizing a signature of files that are being executed or installed (e.g., a portion of the contents in a file, a checksum of a file, the size of a file, etc.), or by using other known techniques for detecting files.

To manage this problem, the install control module uses known metamorphic stealthing techniques to generate an installation package including a metamorphic installation program that prevents detection and attack by active threats during installation. The metamorphic stealthing techniques used can be similar to those used by metamorphic viruses and other malicious code to disguise themselves from detection by antivirus software by morphing themselves at the binary level in such a way that the viruses look different every time they infect a computer. The metamorphic installation program can be built to be undetectable using common string or binary pattern matching techniques, making it difficult for the malicious code to detect the installer by searching for key words (e.g., "antivirus" and other terms). Thus, by the time the malicious code realizes that the installation is occurring, the metamorphic program has already been installed and is already protecting the installation.

In another embodiment, the install control module performs an installation on an inactive machine by booting a preinstall environment. The install control module installs the software application offline, while the primary operating system is not running, and thus before any malicious code on the computer has a chance to attack the installation. After installation of the software application, the computer can boot into the primary operating system and the newly installed software application can execute.

As used herein, the term "identifying information" includes any type of information that can be used by malicious code to identify the nature of a program, or more specifically, to identify that a program is an installation program that might be used for installing software (e.g., computer security software, such as antivirus software), including names, key words or phrases, etc. within a string or file associated with the program (e.g., the name "Symantec" or "Norton Antivirus," the term "antivirus," "install," etc.) or other information for identifying the program. The term "metamorphic stealthing techniques" includes any type of technique used to disguise a program or to modify or morph a program to look different or otherwise be disguised, including techniques used to create metamorphic or polymorphic viruses, techniques used by these viruses to hide themselves from antivirus software, self-decryption or self-modification techniques, and the like. The term "metamorphic installation program" includes a program, as described herein, which is generated using metamorphic stealthing techniques (thus, the word "metamorphic" in the name "metamorphic installation program" refers not to the program being metamorphic itself, but to the fact that the program is generated using metamorphic stealthing techniques, as described to above). As used herein, the term "protection module" includes any type of module installed onto a computer before or during installation of a software application that protects the installation of the software application from threats (e.g., malicious code) and thereby allows the installation to occur. As used herein, the term "main installer" includes a software installation program for installing a software application onto a computer. While the embodiment of the invention that applies to installation of antivirus software is often described herein, the invention can be used with any type of software, including anti-spam software, anti-spyware software, and any other type of general malware or malicious code removal software, and to other types of software unrelated to malware removal.

FIG. 1 is a high-level block diagram illustrating a computing environment 100 according to an embodiment of the present invention. Multiple client computers 110 are in communication with the Internet 112 or other network, such as a local area network, wide area network, etc. via communications links 114. Although only four client computers 110 are shown in FIG. 1, there can be thousands or even millions of computer systems coupled to the Internet 112, according to embodiments of the present invention. In one embodiment, the client computers 110 are conventional computer systems. In other embodiments, one or more of the client computers 110 are different electronic devices having connectivity to remote update sources, such as cellular telephones, personal digital assistants (PDAs), etc. A server 116 is also connected to the Internet 112 via a communications link 118.

As is known in the art, the client computers 110 preferably execute an operating system and one or more application programs. The operating system controls the operation of the computer system, and some examples of such an operating system include LINUX®, one of the versions of MICROSOFT WINDOWS®, PALM OS®.

In FIG. 1, each client computer 110 is connected to the Internet via a communications link 114. Preferably, the communications link 114 utilizes conventional networking technology. For example, in one embodiment a client computer 110 uses a modem to connect over standard telephone lines with an Internet Service Provider (ISP) having a high-speed connection to the Internet 112. In another embodiment, a client computer 110 uses a digital subscriber line (DSL) or cable modem to access the ISP via a telephone line or cable television line, respectively. In yet another embodiment, the client computer 110 uses a network card and Ethernet connection to directly connect to the Internet 112. In still other embodiments, the communications link 114 connects the client computer 110 via a wireless 802.11, Bluetooth, or mobile phone (e.g., CDMA or GSM) network, satellite downlink, uplink, or bi-directional link, etc. Thus, many different types of technology can be used to provide the functionality of the communications link 114.

As known in the art, the Internet is a large, publicly-accessible network of networks. Individual computers and other devices can utilize communications protocols such as the transmission control protocol/Internet protocol (TCP/IP) to send messages to other computers on the Internet. These messages can use protocols such as the hypertext transport protocol (HTTP), file transfer protocol (FTP), simple mail transport protocol (SMTP), post office protocol 3 (POP3), and Internet message access protocol (IMAP), and data representations such as the hypertext markup language (HTML) and extensible markup language (XML) to carry and exchange information. Embodiments of the present invention may use other communications protocols and languages to exchange data.

Another communications link 118 connects the server 116 to the Internet 112. The server 116 can send information, such as a metamorphic installation program and/or a software application to be installed on a client computer 110, virus definition updates, software updates, and the like across the Internet 112 and to the client computers 110. Additionally, the client computers 110 can send out information or download information (e.g. software updates, antivirus software, etc.) through the Internet 112 from the server 116 or from other computers 110. In some embodiments, the client computers access a website through the Internet 112 to download software including an metamorphic installation program for protecting installation of software on the client computer 110. The communications link 118 is generally the same as the communications links 114 connecting the client computers 110 to the Internet 112. Although only one server 116 and associated communications link 118 are shown in FIG. 1, embodiments of the present invention may have multiple servers and/or links. The server 116 may be a conventional computer system or a network of systems.

In the embodiment illustrated in FIG. 1, each client computer 110 executes an install control module 120 for installation of an application or software subsystem in the presence of threats that are actively attempting to prevent the installation from being completed. The install control module 120 can be a discrete application program, or the module 120 can be integrated into another application program or the client computer's 110 operating system. In some embodiments, a portion of the install control module 120 is executed on the server 116 (e.g., the portion that generates the metamorphic installation program in response to a user's request to download and install a software application from the server 116). Though the clients 110 are shown as being connected to the Internet 112, in some embodiments the clients 110 are only connected to the Internet 112 for a certain period of time or not at all. For example, the software application might be provided for installation from some form of computer-readable medium, such as a CD or DVD, and the metamorphic installation program might be generated off of the medium, rather than being generated by a portion of the install control module 120 residing on a server 116. As another example, the software application might be installed from a computer-readable medium on an inactive operating system using a preinstall environment. Other modifications can be made to accommodate any of the other numerous embodiments of the install control module 120.

Figure 2:
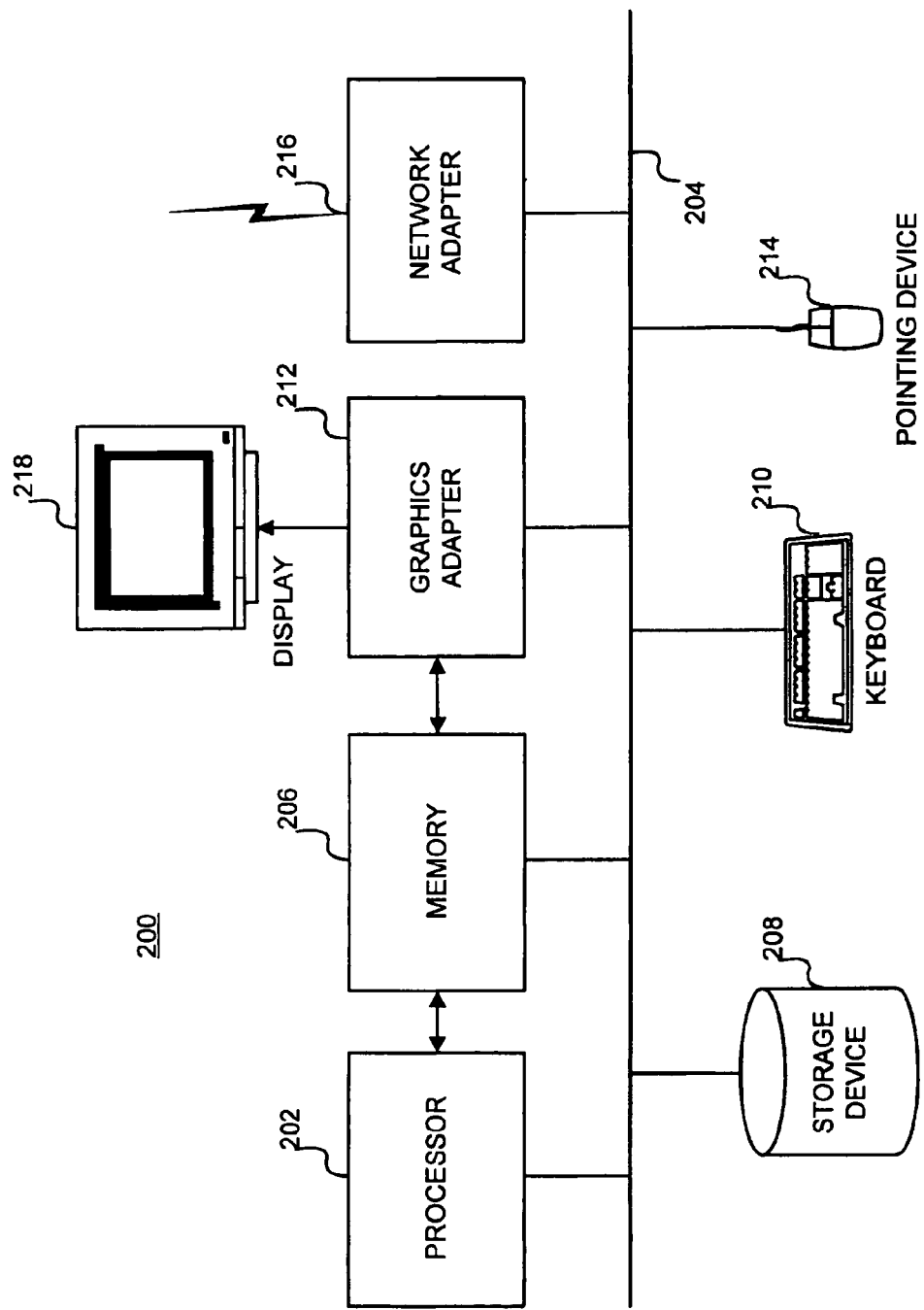
FIG. 2 is a high-level block diagram illustrating a standard computer system 200 for use with the present invention.

FIG. 2 is a high-level block diagram illustrating a functional view of a typical computer system 200 for storing and executing the install control module 120, according to one embodiment of the present invention. This computer system 200 can act as a client computer 110, as shown in FIG. 1. However, one or more of the components of the computer system 200 may be missing or modified in the client computer 110. Illustrated is a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU, or the processor 202 may also be a custom-built processor. The memory 206 may be, for example, firmware, read-only memory (ROM), non-volatile random access memory (NVRAM), and/or RAM, and holds instructions and data used by the processor 202. The storage device 208 is, in one embodiment, a hard disk drive but can also be any other device capable of storing data, such as a writeable compact disk (CD) or DVD, and/or a solid-state memory device. The pointing device 214 may be a mouse, track ball, or other type of pointing device, and is used in combination with the keyboard 210 to input data into the computer system 200. The graphics adapter 212 displays images and other information on the display 218. The network adapter 216 couples the client computer 110 with the Internet 112.

As is known in the art, the computer system 200 is adapted to execute computer program modules for providing functionality described herein. In this description, the term "module" refers to computer program logic for providing the specified functionality. A module can be implemented in hardware, firmware, and/or software. Where the any of the modules described herein are implemented as software, the module can be implemented as a standalone program, but can also be implemented in other ways, for example as part of a larger program, as a plurality of separate programs, or as one or more statically or dynamically linked libraries. It will be understood that the modules described herein represent one embodiment of the present invention. Certain embodiments may include other modules. In addition, the embodiments may lack modules described herein and/or distribute the described functionality among the modules in a different manner. Additionally, the functionalities attributed to more than one module can be incorporated into a single module. In one embodiment of the present invention, the modules are stored on the storage device 208, loaded into the memory 206, and executed by the processor 202. Alternatively, hardware or software modules may be stored elsewhere within the computer system 200.

Figure 3:
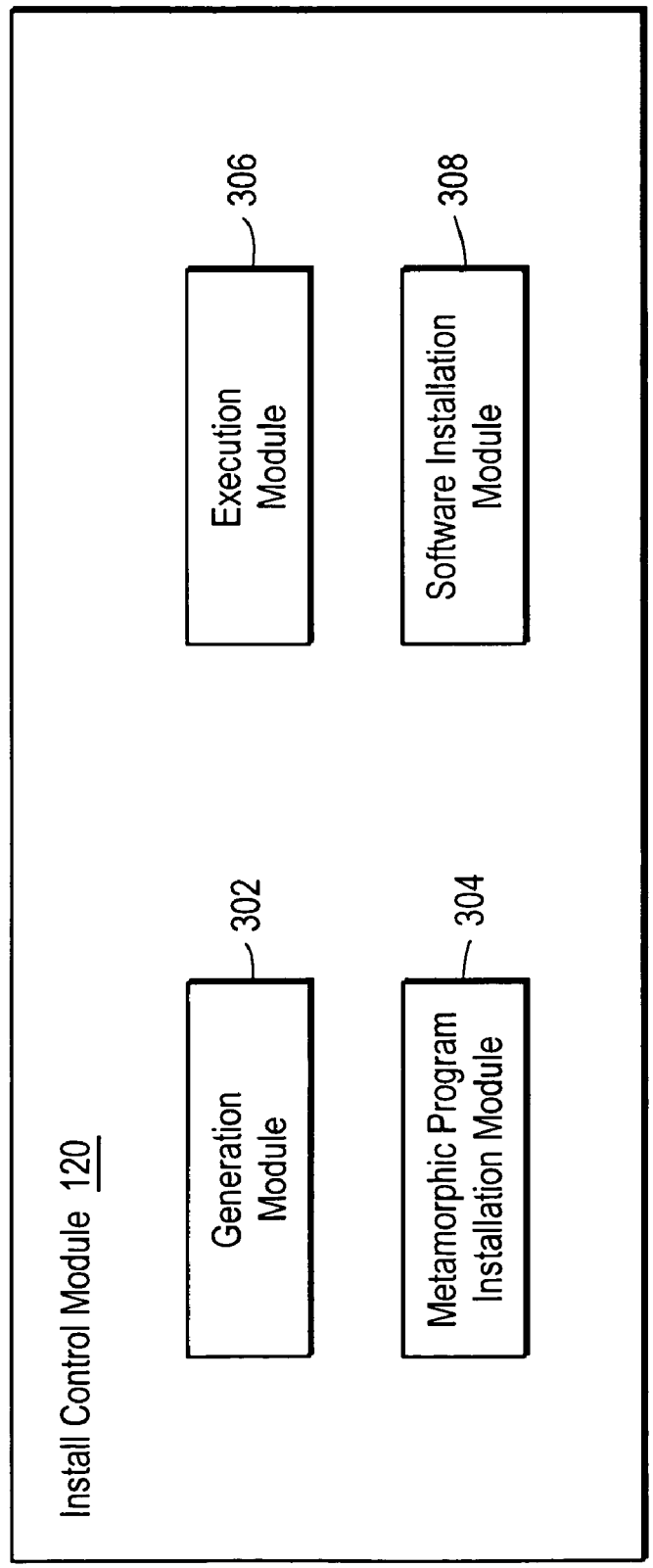
FIG. 3 is a high-level block diagram illustrating the functional modules within the install control module 120 for generating a metamorphic installation program, according to one embodiment of the present invention.

FIG. 3 is a high-level block diagram illustrating the functional modules within the install control module 120, according to one embodiment of the present invention. The install control module 120, in the embodiment illustrated in FIG. 3, includes a generation module 302, a metamorphic program installation module 304, an execution module 306, and a software installation module 308. Those of skill in the art will recognize that other embodiments can have different and/or additional modules other than those shown in FIG. 3 and the other figures. Likewise, the functionalities can be distributed among the modules in a manner different than described herein.

The generation module 302 generates a metamorphic installation program for installation of the software application onto the computer 110. The metamorphic installation program is generated randomly to be substantially unique using metamorphic stealthing techniques, though the program still has substantially the same functionality as other unique instances of the metamorphic installation program. The module 302 can generate a unique binary install package including the metamorphic installation program, which can be designed to be unique at the binary level, and thus not readily identifiable by malicious code. In some embodiments, the metamorphic installation program can be built so that each installation package including the program looks different for every package produced (though the program still performs the same protection function for each package). For example, the module 302 can make random modifications to the code of the metamorphic installation program in a different manner each time an installation package is provided to a user. As some examples, the order of parallelizable instructions can be changed, code can be decompiled and recompiled with randomized compiler settings, loops can be randomly flattened or inserted, no-op or unreachable code can be inserted, images can be altered without changing their appearance, etc. Many other randomizable methods of code and data transformation or obfuscation will be readily appreciated and incorporated by those of ordinary skill without damaging the functionality of the code. The program can be designed to be undetectable using common string or binary pattern matching techniques, making it difficult for the malicious code to detect the installer by searching for key words. Thus, terms that the malicious code might be searching for to determine the identity of the program, such as "antivirus" and other terms or signatures, can be hidden or modified to be unrecognizable by the malicious code.

In some embodiments, the metamorphic program is generated as a protection module that is installed onto the computer 110 before or during the main installation of the software application by a main installer. Since the protection module described herein is a metamorphic installation program, it is disguised upon execution and identifying information (e.g., identifying names or signatures, etc.) that might be used by malicious code to recognize the program to be an installer is hidden. Thus, the malicious code on the computer 110 will not recognize that the protection module is an installation program. This metamorphic program/protection module, once installed, works similarly to other protection modules previously described in that it can be a small module that can be installed and executed on the computer 110 to then protect the remainder of the software installation and to prevent threats from attacking the new installation. In some embodiments, the protection module is the only portion of the installation package that is metamorphic in nature, and the rest of the installation package is the standard package offered by a software vendor (e.g., including the software application and main installer).

In other embodiments, instead of generating the metamorphic installation program as a protection module, the generation module 302 generates a metamorphic installation program that acts as the main installer that installs the software application onto the computer 110. In these embodiments, the main installer is itself the metamorphic portion of the installation package. Instead of first installing a metamorphic installation program in the form of a protection module onto the computer 110 to protect the main installation, the metamorphic installation program is the main installer that is executed on the computer and both installs and protects the installation of the software application. Since the main installer is metamorphic, it is substantially undetectable by malicious code as an installer, so it can install the software application before any malicious code on the computer 110 detects that the installation of the particular software application (e.g., security software) is occurring and has a chance to block the installation.

The installation of the software application can be initiated in a number of ways. For example, an attempt can be made to download the software application from a particular website offering the application. A user can access the server 116 to download the software application of interest and can enter in the associated information (e.g., credit card and identification information, etc.). For each download, the download server 116 can generate a unique metamorphic installation program for that installation. A different metamorphic installation program in which the binary contents are unique can be generated for each download. Once the metamorphic installation program has been downloaded and executed without detection on the computer 110, it can then protect the installation of the software application during the remainder of the installation process.

In other embodiments, the software application is to be installed from a computer-readable medium, such as a CD, a DVD, a floppy disk, a USB key, and so forth. In some embodiments, the metamorphic installation program is generated in a manner similar to that described above where the metamorphic program is downloaded from the server 116. In these embodiments, the remainder of the installation proceeds from the removable medium. In some embodiments, when installing a software application from a computer-readable medium, the metamorphic installation program is generated from the medium, itself. In these embodiments, the metamorphic installation program is generated from the medium on a clean computer 110, rather than on the threat-infected computer 110. This second, clean computer 110 is used to generate the metamorphic installation program in an environment that is free from threats that might prevent or hinder the generation. The metamorphic installation program can be generated and copied to a floppy disk or other medium, or a new metamorphic install CD/DVD (or other medium) can be created including the generated metamorphic installation program. The newly generated metamorphic installation program on a computer-readable medium can then be inserted into the threat infected machine, so the metamorphic installation program can run on the computer 110 and the software application can then be installed without detection. If a new CD or DVD was generated, the complete install can proceed from CD/DVD. If a floppy was generated, the metamorphic installation program can be installed from the floppy disk, and once the metamorphic program is active, the remainder of the install can proceed from CD/DVD.

In some embodiments, the metamorphic program installation module 304 installs the metamorphic installation program onto the computer 110. In some embodiments, once the metamorphic installation program is installed, it can also be used to protect future software application installations. As one example, where the metamorphic installation program is a protection module, it can be installed onto the computer 110 as a program separate from the main installer for later use in protecting installations. In this example, since the protection module is separate from the software application itself, the protection module can be easily updated when necessary as a separate entity. Thus, in some embodiments, the metamorphic installation program is installed onto the computer 110 by module 304. However, in other embodiments, the module 304 is not present and the metamorphic installation program performs its protection function without actually being installed on the computer 110.

The execution module 306 executes the metamorphic installation program on the computer 110. As described above, identifying information in the metamorphic installation program is substantially disguised from the malicious code, and thus, the metamorphic installation program is substantially unrecognizable by malicious code on the computer, though the program still has substantially the same functionality as other unique instances of the metamorphic installation program (e.g., it still performs its protection function). As described above, the identifying information (e.g., signatures or key terms, etc.) can include information that might be used by malicious code to identify the metamorphic installation program as running a process that the malicious code would like to prevent (e.g., installation of a computer security program, such as an antivirus scanner, a behavior blocker, an antispam product, an anti-adware or anti-spyware product, and so forth). The malicious code might also look for identifying information that indicates that the metamorphic program is an installer or has installation capabilities (e.g., if the malicious code is monitoring all installations on the computer 110). The identifying information is disguised by being hidden, removed, or otherwise modified in a manner such that the malicious code cannot readily identify the information. Thus, the program is substantially unrecognizable by the malicious code, since the malicious code is unable to identify what type of program it is, or is unable to identify that it is an installation program.

In some embodiments, the metamorphic program can be difficult for malicious code to detect initially as an installation protection program, but the metamorphic program changes into the installation protection program during execution. In some embodiments, the metamorphic installation program includes a self-decrypter or other modification technology that allows the program to change into a different, non-metamorphic or non-disguised state. For example, during execution, the disguised metamorphic program can decrypt itself or can morph into the actual installation protection program that it is (e.g., the identifying information is no longer disguised) before any threat on the computer 110 recognizes it to be an installation protection program. This change can occur, for example, by changing one or more files of the installation program, or to on-the-fly decrypt parts of the installation program before they are executed. By the time this change occurs, it is generally too late for the malicious code to take action to prevent the installation from occurring. The metamorphic installation program can then perform its function of allowing installation of the software application on the computer 110 without interference.

In other embodiments, the metamorphic installation program is generated by writing different routines that look different but each ultimately results in the same function being performed. For example, to do a mathematical operation to zero out a number, it is possible to set the variable "i" such that i=0. It is possible to either assign i with a numeric value of 0 or to exchange i with itself so that it then becomes 0. Thus, there are two different instruction states that the CPU sees, but the end result is the same and the identifying information that might identify the metamorphic program to be an installer is disguised from the malicious code.

The software installation module 308 installs the software application onto the computer, and the metamorphic installation program protects the installation to allow the installation to occur without substantial interference from the malicious code. As described above, the metamorphic installation program is executed on the computer 110 (e.g., either as the main installer or as a protection module) in a metamorphic format that makes it substantially unidentifiable and undetectable by malicious code. Thus, the software application can then be installed onto the computer 110 (e.g., either from a disk or after being downloaded from a server 116) without interference from the malicious code (e.g., the malicious code is not able to prevent the installation or cause the installation to occur incorrectly). The software application can install correctly and completely, and the malicious code is unable to prevent or otherwise cause problems with the installation. As one of ordinary skill in the art will recognize, where the metamorphic program is a protection module, it can protect the installation in a manner similar to the methods used by protection modules currently known in the art, such as Symantec's SymProtect™ product.

Figure 4:
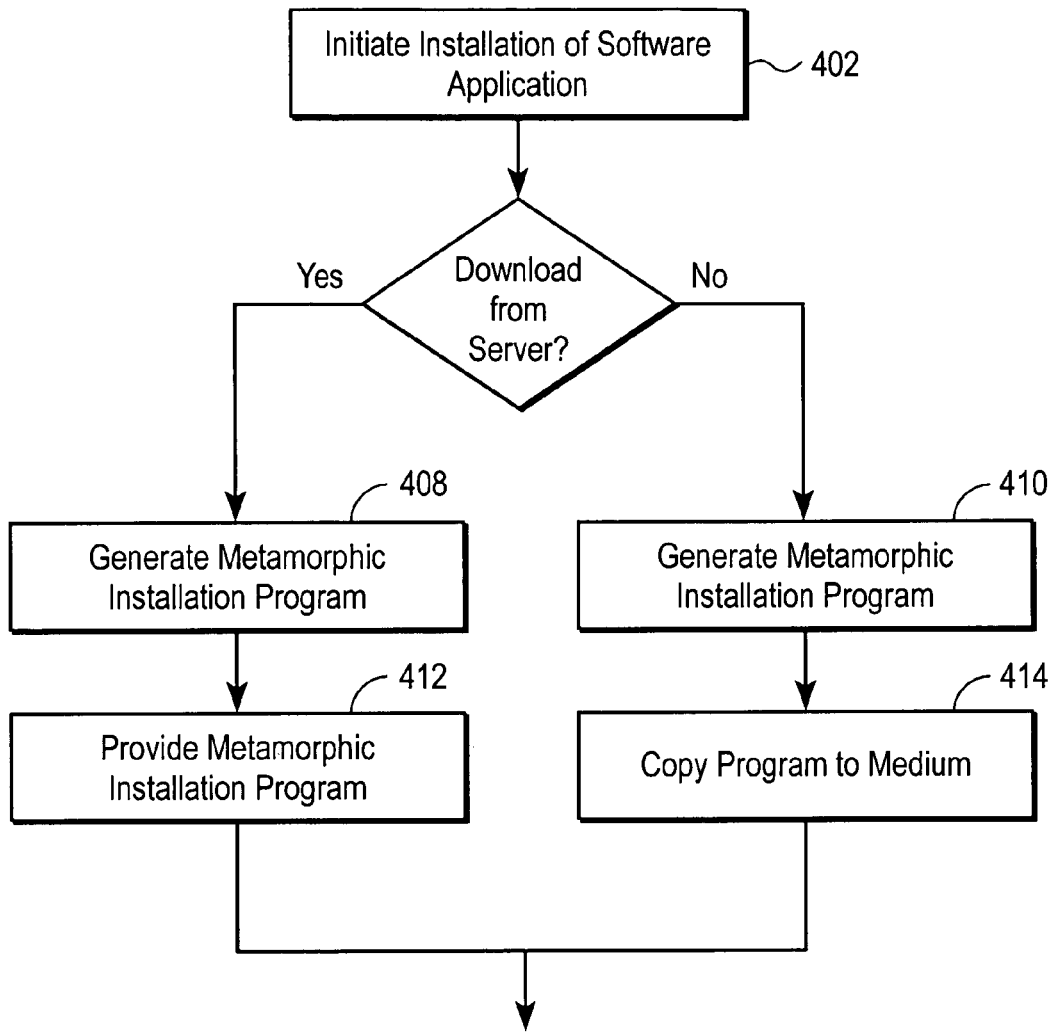
FIG. 4 is a flowchart illustrating steps performed to generate a metamorphic installation program, according to one embodiment of the present invention.

Referring now to FIG. 4, there is shown a flowchart illustrating the operation of the install control module 120, according to some embodiments of the present invention. It should be understood that these steps are illustrative only. Different embodiments of the install control module 120 may perform the illustrated steps in different orders, omit certain steps, and/or perform additional steps not shown in FIG. 4 (the same is true for FIG. 5).

As shown in FIG. 4, the install control module 120 initiates 402 installation the software application. For example, the initiation 402 step might occur in response to an attempt by a user to download a software application from a server 116 or in response to a user inserting a disk or other form of removable media containing the installation package into a computer 110 to begin installation (or inserting a disk into a clean computer to generate the metamorphic installation program). If the software application is to be downloaded and installed from a server 116, the user can provide the necessary information (e.g., personal information, credit card data, etc.) to the server 116. The install control module 120 can then generate 408 the metamorphic installation program in response to the user's request to download and install a software application. Once the metamorphic installation program has been generated 408, it can then be provided 412 to the user so the user can download the program.

If the software application is not to be downloaded and installed from the server 116, then the software application might be available on some type of removable media (e.g., a CD, DVD, flash media, floppy disk, etc.). The user can insert the disk or other form of media into the computer 110 to generate 410 the metamorphic installation program off of the disk. In some embodiments, the user inserts the disk into a clean computer so the install control module 120 can generate 410 the metamorphic installation program on the clean computer where no malicious code is present that might interfere with the generation 410. The install control module 120 can copy 414 the program to a floppy disk, or to a CD or DVD to create a new metamorphic CD/DVD. The user can then insert the disk or other type of computer-readable medium into the infected computer 110 onto which the software application is to be installed in order to continue with the installation process.

Figure 5:
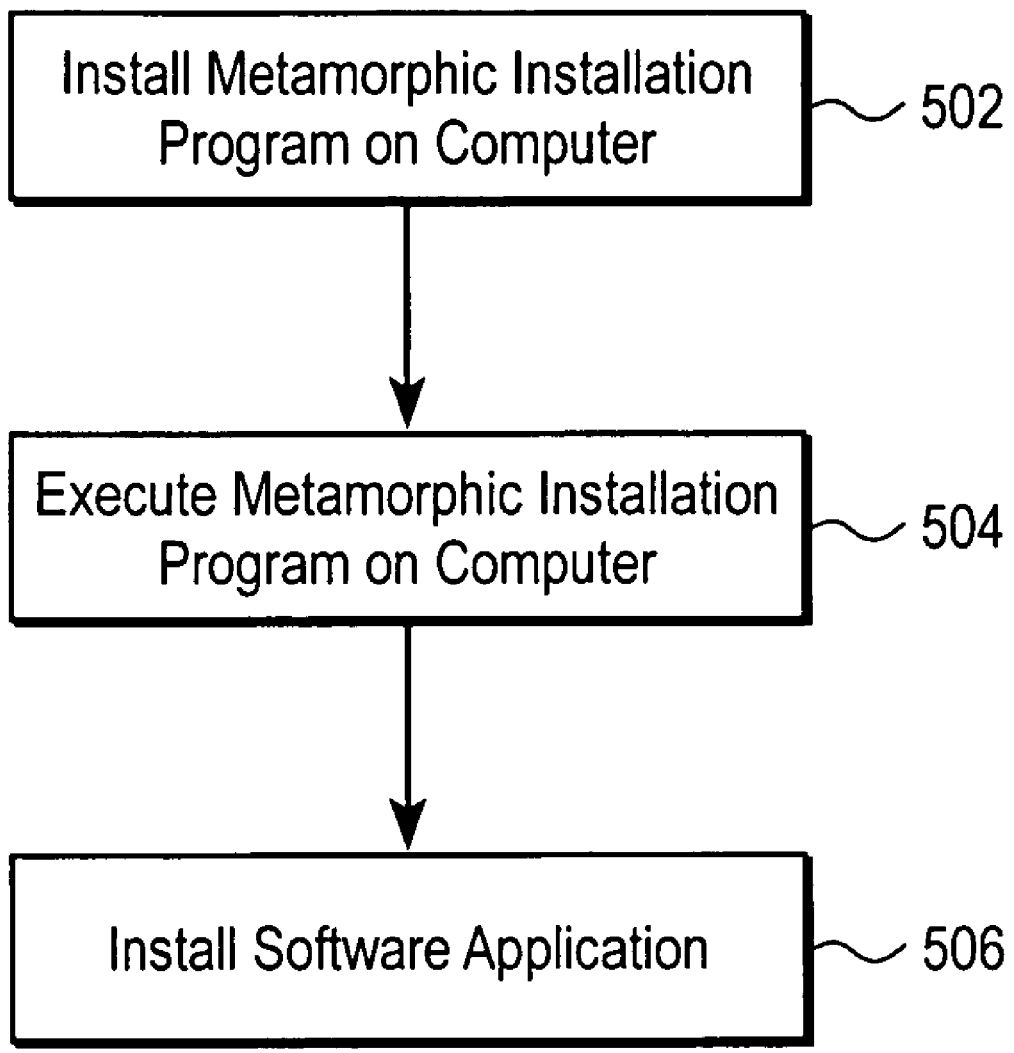
FIG. 5 is a flowchart illustrating steps performed to install the software application where the metamorphic installation program protects the installation, according to one embodiment of the present invention.

Referring now to FIG. 5, there is shown a flowchart illustrating the operation of the install control module 120, according to some embodiments of the present invention. In some embodiments, once the metamorphic installation program has been generated 408, 410 either from the server 116 or from some type of computer-readable medium, the install control module 120 can continue the installation process by optionally installing 502 the metamorphic installation program onto the computer 110. The install control module 120 executes 504 the metamorphic installation program on the computer 504 and the software application is installed 506 on the computer 110 while the metamorphic installation program protects the installation from attacks by malicious code.

Figure 6:
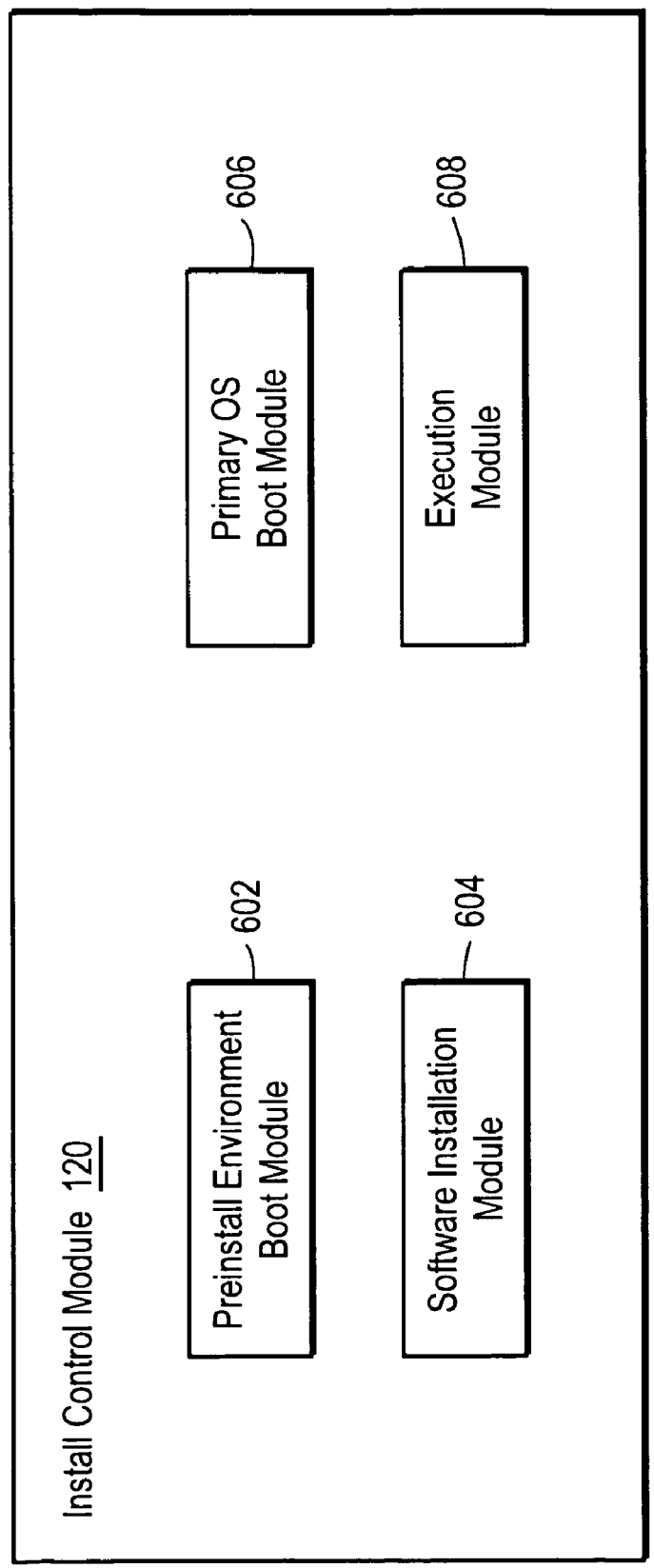
FIG. 6 is a high-level block diagram illustrating the functional modules within the install control module 120 for installing a software application using a preinstall environment on the computer, according to one embodiment of the present invention.

Another embodiment of the install control module 120 is shown in FIG. 6, which is a high-level block diagram illustrating the functional modules within this embodiment of the install control module 120. The install control module 120, in the embodiment illustrated in FIG. 6, includes a preinstall environment boot module 602, a software installation module 604, a primary OS boot module 606, and an execution module 608. Those of skill in the art will recognize that other embodiments can have different and/or additional modules than those shown in FIG. 6 and the other figures. Likewise, the functionalities can be distributed among the modules in a manner different than described herein.

The preinstall environment boot module 602 boots a preinstall environment on the computer, and the computer is booted without running a primary operating system on the computer. In some embodiments, a clean boot CD or DVD is used to boot into a preinstall environment, such as the Windows Preinstall Environment or WinPE™. In some embodiments, malicious code present on the computer 110 can then be removed using one or more antivirus or other programs for removal of viruses, etc.

The software installation module 604 installs the software application onto the computer running the preinstall environment. The installation occurs offline without the primary operating system running, and thus the installation occurs before malicious code that may be present on the computer is executed. Thus, as an alternative to generating a metamorphic installer for removable media installs (e.g., CD, DVD, floppy disk, USB key, etc.), the software application can be installed on an inactive machine in an offline installation. In some embodiments, the install medium has the ability to boot the target computer 110 and mount the target operating system file and registry subsystems without executing code present on the threat-infected machine. The module 604 can then proceed to install the software application onto the inactive primary operating system.

The primary OS boot module 606 boots the primary operating system on the computer 110 once the installation has occurred. Since the software application was installed while running the preinstall environment, the newly installed software application is now present on the computer 110 when running the primary operating system and the application is ready to be executed.

The execution module 608 executes the installed software application without substantial interference from malicious code that may be present on the computer. In some embodiments, upon reboot, the software application runs before any malicious code present on the computer starts up. If the software application is an antivirus or similar type of application, the application can monitor to determine if any malicious code does start up, and the newly installed software application can prevent or otherwise eliminate the threats.

As another embodiment, the user can clean boot the computer 110 from a CD or DVD, remove the now passive threats using a threat removal program (e.g., ERASER™), and can then boot into the primary operating system. The installation on the clean machine can then proceed without interference from the malicious code. This clean boot embodiment provides a number of benefits, for example with regard to protecting against rootkits (e.g., the SONY® "rootkit"), which have the ability to stealth their presence on the machine. For example, if the rootkit code started running before the antivirus or other protection or detection code, the rootkit could hide its presence from the detection and removal applications. But, when the primary operating system is inspected from the preinstall environment, the rootkit cannot hide its presence and its files and registry keys become visible. Another benefit of the clean boot embodiment is the fact that it is useful in protecting computers 110 in an environment where threats are continually being updated to circumvent current detection and removal technology. Thus, even if the computer 110 is clean and some type of protection software is running on the computer 110, the authors of these threats often find ways to circumvent the protection technology and infect the machine. Until the protection software is updated to catch these newly updated threats, a useful solution is to do a clean boot of the computer 110 and remove the threat offline when the threat is in a passive and detectable state.

Figure 7:
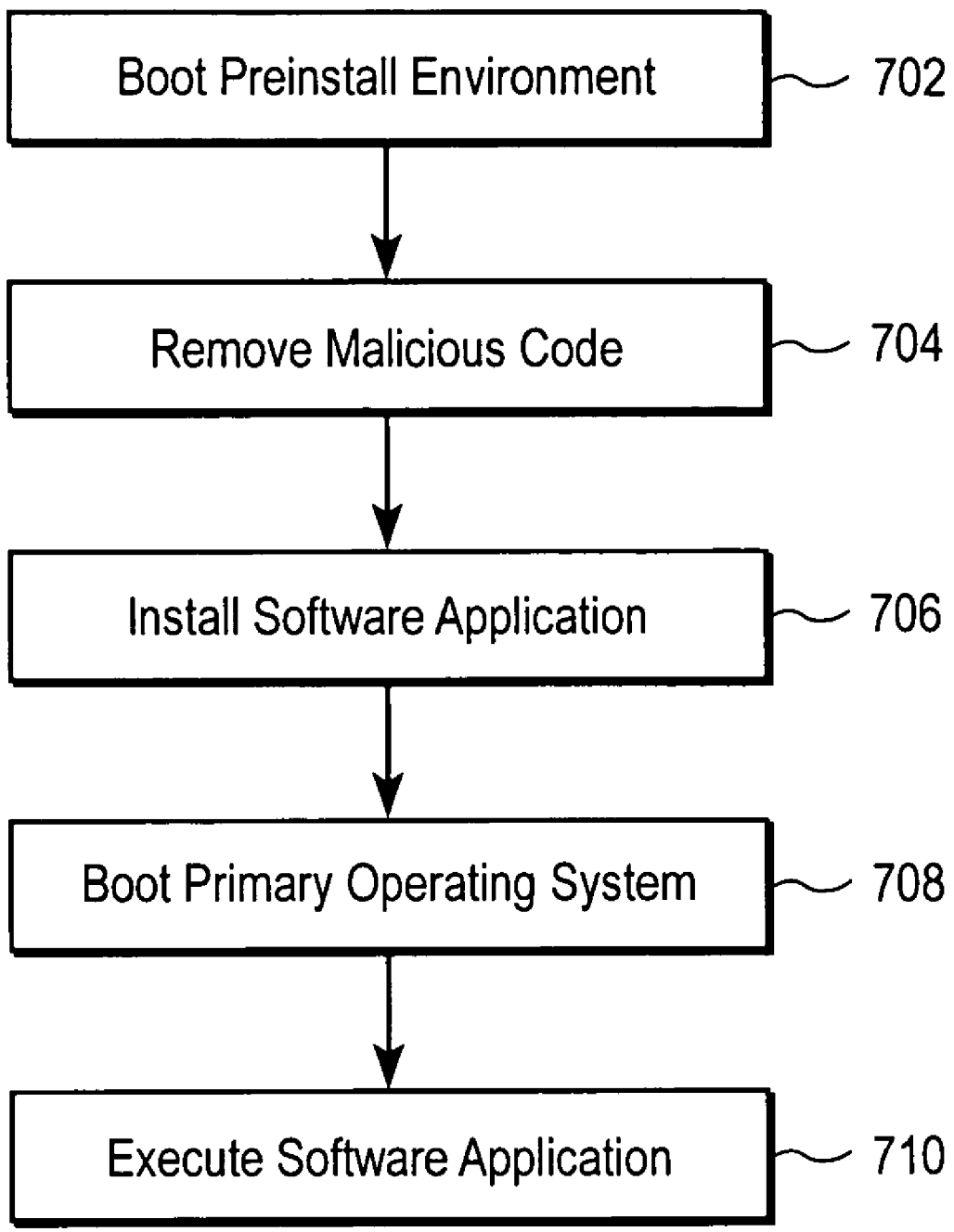
FIG. 7 is a flowchart illustrating steps performed to install the software application using the preinstall environment, according to one embodiment of the present invention.

Referring now to FIG. 7, there is shown a flowchart illustrating the operation of the install control module 120, according to an embodiment of the present invention. Different embodiments of the install control module 120 may perform the illustrated steps in different orders, omit certain steps, and/or perform additional steps not shown in FIG. 7.

As shown in FIG. 7, the install control module 120 boots 702 a preinstall environment on the computer 110. The computer can thus be booted without running a primary operating system on the computer 110. In some embodiments, the install control module 120 optionally removes 704 malicious code present on the computer 110. The malicious code can be removed using one or more antivirus or other programs for removal of viruses, worms, Trojan horses, etc. The module 120 can then install 706 the software application onto the computer running the preinstall environment. This installation can occur offline without the primary operating system running, and thus the installation occurs before malicious code that may be present on the computer is executed. The module can then boot 708 the primary operating system on the computer 110 and then execute 710 the installed software application without substantial interference from malicious code that may be present on the computer. If threats are present on the computer 110 and if the software application is an antivirus application, the software application can then remove those threats or otherwise take action to protect the computer 110 against the malicious code.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present

I claim:

1. A computer program product having a computer-readable medium having computer program instructions recorded thereon for installation of a software application onto a computer in presence of malicious code that is attempting to prevent installation, the computer program instruction comprising instructions for:
generating a metamorphic installation program for protecting the installation of the software application onto the computer, wherein the metamorphic installation program is generated randomly to be substantially unique while still having substantially a same functionality as other unique instances of the metamorphic installation program;
executing the metamorphic installation program on the computer, wherein identifying information in the metamorphic installation program is substantially disguised from the malicious code so the metamorphic installation program is substantially unrecognizable to the malicious code; and
installing the software application onto the computer, wherein the metamorphic installation program protects the installation to allow the software application to be installed without substantial interference from the malicious code by preventing the malicious code from detecting the installation of the software application.

2. The computer program product of claim 1, further comprising instructions for installing the metamorphic installation program onto the computer, wherein the metamorphic installation program comprises a protection module that is installed on the computer prior to installation of the software application, the protection module for protecting installation of the software application by a main installer.

3. The computer program product of claim 1, wherein the metamorphic installation program is a metamorphic main installer that installs the software application onto the computer while protecting the software application installation.

4. The computer program product of claim 1, wherein the metamorphic installation program is further configured to modify itself during the execution so the identifying information is no longer disguised.

5. The computer program product of claim 1, wherein the software application is a computer security program.

6. The computer program product of claim 1, wherein the disguised identifying information is undetectable using string matching techniques.

7. A method of installation of a software application onto a computer in presence of malicious code that is attempting to prevent installation, the method comprising:
generating a metamorphic installation program for protecting the installation of the software application onto the computer, wherein the metamorphic installation program is generated randomly to be substantially unique while still having substantially a same functionality as other unique instances of the metamorphic installation program;
executing the metamorphic installation program on the computer, wherein identifying information in the metamorphic installation program is substantially disguised from the malicious code so the metamorphic installation program is substantially unrecognizable to the malicious code; and
installing the software application onto the computer, wherein the metamorphic installation program protects the installation to allow the software application to be installed without substantial interference from the malicious code by preventing the malicious code from detecting the installation of the software application.

8. The method of claim 7, further comprising installing the metamorphic installation program onto the computer, wherein the metamorphic installation program is a protection module that is first installed on the computer before installation of the software application begins, the protection module for protecting installation of the software application by a main installer, wherein the protection module further protects future software application installations from disruption by malicious code.

9. The method of claim 7, wherein the metamorphic installation program is a metamorphic main installer that installs the software application onto the computer while protecting the software application installation.

10. The method of claim 7, wherein metamorphic installation program modifies itself using a self-decrypter during the execution to decrypt itself into an undisguised metamorphic installation program with the identifying information being no longer disguised.

11. The method of claim 7, wherein generating the metamorphic installation program further comprises downloading the metamorphic installation program from a server.

12. The method of claim 7, wherein generating the metamorphic installation program further comprises generating the metamorphic installation program on a substantially clean computer from a computer-readable medium.

13. A system for installation of a software application onto a computer in presence of malicious code that is attempting to prevent installation, the system comprising:
a generation module for generating a metamorphic installation program for protecting the installation of the software application onto the computer, wherein the metamorphic installation program is generated randomly to be substantially unique while still having substantially a same functionality as other unique instances of the metamorphic installation program;
an execution module for executing the metamorphic installation program on the computer, wherein identifying information in the metamorphic installation program is substantially disguised from the malicious code so the metamorphic installation program is substantially unrecognizable to the malicious code; and
a software installation module for installing the software application onto the computer, wherein the metamorphic installation program protects the installation to allow the software application to be installed without substantial interference from the malicious code by preventing the malicious code from detecting the installation of the software application.

14. The system of claim 13, further comprising a metamorphic program installation module for installing the metamorphic installation program onto the computer, wherein the metamorphic installation program is a protection module that is first installed on the computer before or during installation of the software application, the protection module for protecting installation of the software application by a main installer.

15. The system of claim 13, wherein the metamorphic installation program is a metamorphic main installer adapted for installing the software application onto the computer.

16. The system of claim 13, wherein metamorphic installation program is adapted to modify itself during the execution so the identifying information is no longer disguised and is adapted to decrypt parts of the metamorphic installation program in real-time right before those parts are executed and before detection by the malicious code that the program is installing the software application.

17. The system of claim 13, wherein the generation module is adapted to download the metamorphic installation program from a server.

18. The system of claim 13, wherein the generation module is further adapted to generate the metamorphic installation program on a substantially clean computer from a computer-readable medium.

19. A system for installation of a software application onto a computer in presence of malicious code that is attempting to prevent installation, the system comprising an install control module configured for:

generating a metamorphic installation program for protecting the installation of the software application onto the computer, wherein the metamorphic installation program is generated randomly to be substantially unique while still having substantially a same functionality as other unique instances of the metamorphic installation program;

executing the metamorphic installation program on the computer, wherein identifying information in the metamorphic installation program is substantially disguised from the malicious code so the metamorphic installation program is substantially unrecognizable to the malicious code; and installing the software application onto the computer, wherein the metamorphic installation program protects the installation to allow the software application to be installed without substantial interference from the malicious code by preventing the malicious code from detecting the installation of the software application.

20. The system of claim 19, wherein the install control module is further configured for installing the metamorphic installation program onto the computer, wherein the metamorphic installation program is a protection module for protecting installation of the software application by a main installer.

* * * * *

UNITED STATES PATENT AND TRADEMARK OFFICE
CERTIFICATE OF CORRECTION

| | |
|---|---|
| PATENT NO. | : 7,757,284 B1 |
| APPLICATION NO. | : 11/317513 |
| DATED | : July 13, 2010 |
| INVENTOR(S) | : Pieter Viljoen |

It is certified that error appears in the above-identified patent and that said Letters Patent is hereby corrected as shown below:

Title page under "Assignee" item [73], insert --Symantec Corporation--.

Signed and Sealed this
Twenty-seventh Day of December, 2011

David J. Kappos
*Director of the United States Patent and Trademark Office*